United States Patent [19]
Jacobsen

[11] Patent Number: 5,560,799
[45] Date of Patent: Oct. 1, 1996

[54] IN-LINE PRINTING PRODUCTION OF THREE DIMENSIONAL IMAGE PRODUCTS INCORPORATING LENTICULAR TRANSPARENT MATERIAL

[76] Inventor: Gary A. Jacobsen, 225 Cherry St., Itasca, Ill. 60143

[21] Appl. No.: 172,378

[22] Filed: Dec. 22, 1993

[51] Int. Cl.[6] ........................................ B32B 31/00
[52] U.S. Cl. ........................... 156/277; 156/324; 156/204
[58] Field of Search ..................... 156/277, 324, 156/253, 387, 555, 271, 227, 204

[56] References Cited

U.S. PATENT DOCUMENTS

| | | |
|---|---|---|
| 3,482,913 | 12/1969 | Glenn . |
| 3,895,867 | 7/1995 | Lo et al. . |
| 3,960,563 | 6/1976 | Lo et al. . |
| 4,063,265 | 12/1977 | Lo et al. . |
| 4,124,291 | 11/1978 | Lo et al. . |
| 4,468,115 | 8/1984 | Lao . |
| 4,724,449 | 2/1988 | Wright . |
| 4,766,684 | 8/1988 | Lo . |
| 4,800,407 | 1/1989 | Lo . |
| 4,852,972 | 8/1989 | Lo . |
| 4,869,946 | 9/1989 | Clay . |
| 4,956,705 | 9/1990 | Wright . |
| 5,028,950 | 7/1991 | Fritsch . |
| 5,089,338 | 2/1992 | Anderson et al. . |
| 5,108,531 | 4/1992 | Quadracci . |
| 5,126,762 | 6/1992 | Takeuchi et al. . |
| 5,181,745 | 1/1993 | Jacobsen et al. . |

Primary Examiner—James Engel
Attorney, Agent, or Firm—Davis Chin

[57] ABSTRACT

The present invention provides a method of producing in a single in-line process a printed image suitable for creating an illusion of depth in the perception of a viewer of the image, comprising the steps of:

(1) providing an opaque web to an in-line printing process, (2) providing a transparent web to the in-line printing process, the transparent web having a lenticular surface on one side and a flat surface on an opposing side, (3) transporting either the opaque web or the transparent web to a first printer unit of the in-line printing process at a preselected speed and printing a line-formed image on the opaque web or the flat surface of the transparent web, the line-formed image being compatible for viewing when viewed through the lenticular surface of the transparent web, and (4) setting the image on either the opaque web or flat surface of the transparent web in a heat setting unit of the in-line printing process.

In one embodiment of the present invention, only a transparent lenticular web is advanced through the in-line printing system and the line formed image is printed on a flat underside of the lenticular web. In yet another embodiment of the present invention, a dual line formed image is printed on the flat surface of the transparent lenticular web, on the opaque web, or both, to form a final image which changes as the angle at which the image is viewed through the lenticular surface changes. Novel printed products manufactured in accordance with the above methods are also provided.

19 Claims, 3 Drawing Sheets

IN-LINE PRINTING PRODUCTION OF THREE DIMENSIONAL IMAGE PRODUCTS INCORPORATING LENTICULAR TRANSPARENT MATERIAL

FIELD OF THE INVENTION

The present invention relates to the in-line web offset, flexographic or rotogravure roll fed printing press production of printed products which provide the illusion of depth when viewed, for example the illusion of three-dimensional (3-D) images, and more particularly to a commercial process for in-line printing of 3-D images on products which incorporate lenticular transparent material through which a line formed image is visible to create the illusion of depth.

BACKGROUND OF THE INVENTION

Several processes and products have previously been developed to fabricate printed pieces that display an illustrative image which appears to be three dimensional (3-D) when viewed, giving the illusion of depth to the image. For example, 3-D images produced by a printing procedure are set forth in U.S. Pat. No. 5,181,745, which discloses a process having different segments of an image printed by an in-line printing system on sequential transparent layers of material, with one segment of the image, such as the background for example, printed on a paper stock material which forms the bottom layer of the finished product. The final image produces the appearance of depth since the various segments of the image are actually at a distance from each other.

Additionally, virtual three-dimensional printed images have been formed using a combination of lenticular transparent sheet material through which a line formed image, printed on paper or other sheet stock, is viewed. Specially designed photographic techniques are used to produce a line formed image of the subject matter to be displayed, and the array of line formed images thus printed are perceived as a single image when viewed through the lenticular transparent sheet when the lenses of the transparent sheet and the printed line formed images are in proper alignment. U.S. Pat. No. 5,028,950, and earlier patents referred to therein, disclose apparatus and methods for forming such line formed images by single sheet fed, one at a time, printing processes. However, these one at a time printing processes have been found to be unsuitable for producing high volume printed products such as required for mass mailings or other mass distribution, inserts for widely circulated magazines, and the like, due to the higher production costs and lengthy time required for such one at a time processes. In the high volume advertising and mass printing production industries, rapid turn around time is essential.

U.S. Pat. No. 5,028,950 discloses a photography based system for forming a latent line formed image on extruded plastic lenticular transparent photography-based continuous print film from a set of frames of negative images. The printer has an edit station at which images from a number of frames of negative images are generated and visually displayed, and selected data signals for the images are processed to produce key subject identifier signals indicative of the content and location of areas. These signals are compared with signals from other frames. A photographic print station separately projects the image of each frame onto print film.

The image formed beneath the lenticular transparent surface is a line formed image, and is aligned or registered under the array of lenticular lenses. Light passes through the lenses, and the focal length of the lenses focuses lines of light behind the lens array. The spatial frequency of the line formed image is matched to the foci of the lenses formed in the lenticular film. Each image is an independent line behind the lens, and each lens is divided into eight segments. The light passing through the lens is broken into eight segments. The reflected light from the image emerges in eight zones, and the right and left eyes of the viewer observe the reflected light in parallax. The eyes only see a pair of images at one time, but as the eye scans, different pairs of images are viewed, providing in one embodiment the appearance of depth in the image, or a three dimensional image. Also, by placing different images on different lines, the image can be made to change in the eyes of the viewer, whereby the viewed picture becomes animated and changes as the angle from which the image is viewed is altered.

The photographic printer taught in U.S. Pat. No. 5,028,950 does not provide a single in-line web offset, flexographic or rotogravure ink printing process having various screen values or a method of mass producing a printed image as provided by the present invention. Costs are extremely high, and production slow with the process disclosed in U.S. Pat. No. 5,028,950.

Therefore, there exists a need for a lower cost, high speed, high volume printing production system which supplies large quantities of virtual three dimensional image printed products utilizing techniques and materials which incorporate lenticular transparent material and line formed printed screened, i.e.: dotted or spotted, images in proper register beneath the array of lenses found in the lenticular transparent material.

A particular printing process suitable for use with the present invention, in addition to those previously mentioned, is a stochastic high resolution screening system. In a stochastic screening system, traditional screening rules and dot patterns aligned on fixed grids are varied. Instead, halftone dots are replaced with picture images built upon spots created by laser imagesetters. The spots are made to appear more or less often, as required, in a controlled random pattern that creates picture density variations. The randomly placed spots are created at a single uniform size, or alternatively, in patterns having variances in both spot sizes and spot frequency. The computer directs the imagesetter to place more or fewer spots in the picture area, based on the lightness and darkness of the original color area. The "random" placement of spots is actually carefully calculated and performed by algorithims. It is to be understood that the term "printing" in the present description includes stochastic high resolution printing processes.

Accordingly, it is an object of the present invention to provide a process for rapidly producing high volumes of printed products which create an illusion of depth in the perception of the viewer of the image.

Another object of the present invention is to provide a continuous in-line roll fed web offset, flexographic or rotogravure printing process incorporating roll fed lenticular transparent web material, preferably made of plastic or other suitable material, and roll fed paper web stock material, wherein line formed images are printed on the lenticular stock, on the paper stock, or both. The lenticular transparent material is automatically brought into proper and precise register with the line formed image on the paper stock in one embodiment, and a large volume of virtual three dimensional images products are produced in a short time span. In another embodiment, the line formed image is printed on the flat underside of the lenticular web in precise register with the lenses formed on the top side of the lenticular web so that a single image having depth is visible through the lenses.

A further object of the present invention is to provide a continuous in-line printing process incorporating a roll fed web of lenticular transparent material having a multiple lens side and an opposite flat surface, wherein a line formed image is printed on the flat surface of the lenticular transparent material, and additional printing ink is subsequently applied to the flat surface over the line formed image to provide an opaque backing for the image when viewed through the array of multiple lenses formed in the first surface of the lenticular transparent material. If desired, additional printed images and/or test material can be applied on the flat underside of the lenticular material over the additional ink forming the opaque backing. Also, if desired, trimmed paper stock can be glue laminated to the flat underside after the printing steps described above are completed to provide additional strength to the finished product, as well as an additional surface to which printed images and/or text can be applied.

A further object of the present invention is to provide a continuous in-line printing process incorporating roll fed lenticular transparent material and roll fed opaque paper stock material wherein a line formed image is formed on a flat undersurface of the lenticular transparent material, and trimmed segments of the paper stock material are adhered to the flat undersurface of the transparent material after the line formed image has been printed on the flat undersurface to provide a backing for the reflection of light when products produced by the process are viewed through the array of lenses on the upper surface of the lenticular transparent material.

In each of the finished products mentioned above, the line formed image situated beneath and in proper register with the lens array formed in the lenticular surface of the transparent material appears as a three dimensional object to the viewer. If the line formed image to be viewed is printed by placing different images on alternating different lines, the viewed image will change as the angle from which the image is viewed changes.

These and other objects of the various embodiments of the present invention, as well as the advantages thereof, will become more evident from the following disclosure.

SUMMARY OF THE INVENTION

The present invention provides a method of rapidly producing a high volume of printed screened or stochastic image products suitable for creating an illusion of depth in the perception of a viewer of the image.

In one embodiment of the method of the present invention, an opaque web and a transparent web having a lenticular surface and a flat undersurface are provided to an in-line printing system. The lenticular surface comprises corrugations or grooves molded, extruded, embossed or otherwise formed in the surface, forming a multiplicity of linearly arrayed lens elements in the lenticular surface. One of the two roll fed webs is transported and fed into the input of the first of a series of four color perfecting web, flexographic or rotogravure printing units of an in-line roll fed production printing press at a preselected speed for printing an image on the selected web substrate, the image being a line formed screened image which is viewed as an almost continuous tone image when viewed through a compatible lenticular surface. When the web being fed is the lenticular material, the line formed image is applied to the flat undersurface of the lenticular web material. The printed image on the web is set by passing the same through a heat setting unit, the web advancing through the heat setting unit at the preselected speed.

The other roll fed web of material is transported to and fed into the input of a second set of an in-line series of four color perfecting printing units, using web offset, flexographic, or rotogravure production printing equipment. This second set of print units, in certain embodiments, may be a printer assembly, but not equipped with printing plates, since only one of the two webs is provided with a viewable image thereon in these certain embodiments. The second set of print units advances the other web in parallel and at the same speed as the first web. The two webs are then advanced together and in register through a ribbon/slitting unit and a glue laminating unit at the preselected speed, and the webs are laminated together with the opaque web located beneath and in register with the transparent web. The glue laminated webs are advanced at the preselected speed into a sheeter and/or rotary cutter or trimmer which cuts the glue laminated webs into predetermined size sheets or units.

The line formed image, printed as described above and appearing on either the opaque paper web or the transparent web, or both, creates the illusion of depth in the final image when that image is viewed through the lenticular surface. Desirably, the line formed image is printed in the form of dots at a screen value or spots, wherein the image appears almost as a continuous tone image. Preferably, the image is printed in four process color inks using four color separation printing of dots of yellow, cyan, magenta and black, which are the four color process inks, or spots, to form a multicolor almost continuous tone image by techniques known in the printing art.

In one preferred method, the line formed image is printed on the flat undersurface of the transparent web opposite the lenticular surface. The surface of the transparent web opposite the lenticular surface, upon glue laminating the web to the opaque web, will be the underside of the transparent web which is in contact and is glue laminated to the opaque web. The line formed image may also be printed on the opaque web. The image printed on the opaque web will be facing and ultimately will be laminated to the transparent web.

It may also be desirable to print an additional image on the one web which was not previously printed as described above. In this preferred method, if the first line formed image was printed on the flat underside of the transparent web, then the additional image can be printed on the opaque web. Conversely, if the first line formed image was printed on the opaque web, then the additional image can be printed on the transparent web. In either case, after the first and second images have been printed by advancing the webs through printers at the preselected speed, the printed line formed images are set by advancing the webs through the same or different heat setting units at the preselected speed. Upon glue laminating the webs together by advancing the webs through a glue laminating unit at the preselected speed, the image printed on the laminated sheet creates the illusion of depth in the final image when viewed through the lenticular surface.

In another preferred aspect of the invention, the method may include the in-line production of a multi-page signature having a die cut cover layer overlying a lenticular three dimensional image.

The method of the present invention may also include, in the laminating step, advancing the opaque web and the transparent web at the preselected speed to a glue laminating unit, applying glue or other suitable adhesive to the webs, and pressing the webs together. The glue laminating step may further include passing the webs through a laminating nip roll station after passing the webs through a gluing unit.

The method of the invention, in the steps of printing an image on at least one of the opaque web and the transparent web, includes the step of printing a line formed image on the one web which comprises segments of the printed image in linear side by side relationship to form a single, unified image when viewed through the lenticular surface of the transparent web. The line formed image is dimensioned to be compatible with the lenticular lens array formed in the transparent web.

In another aspect of the invention, the method produces in a single roll fed web offset, flexographic or rotogravure in-line process a printed simulated moving animated image that changes based upon the angle at which the image is viewed. In this aspect of the invention, the method includes the steps of providing an opaque web, and a transparent web having a lenticular surface, and transmitting one of the webs to a first printer at a predetermined speed for printing on the one web a lined formed dual image in linear side by side relationship to form two separately distinguishable images when viewed through the coordinated lenticular surface of the transparent web at varying angles. The method includes setting the image on the one web in a heat setting oven while advancing the one web through the oven at the preselected speed, then advancing both webs through a glue laminating unit at the preselected speed and glue laminating the webs together with the opaque web located beneath the transparent web, and advancing the laminated webs at the preselected speed into a rotary cutting unit which cuts the laminated webs into finished ready product, or a sheeter to deliver maximum sized sheets as only limited by the maximum size of the printing press itself.

In another embodiment of the invention, after a screened or spot printed image has been applied to the flat underside of the lenticular transparent material, and the web has passed through an ink-setting oven, sufficient additional opaque ink is applied to cover the full area of the flat underside of the lenticular film. The inked surface reflects light when the image is viewed, and in this reflective print embodiment, the need for a separate paper stock backing is eliminated.

In yet another embodiment of the invention described in the preceding paragraph, a further step is provided wherein additional text or images are printed on the previously imprinted opaque flat underside of the lenticular film. For example, the image viewed through the lenticular lenses may be a sports action image, with appropriate explanation, identification and/or statistics printed on the reverse side of the product. Also, a ribbon or pre-trimmed paper may be one hundred percent or pattern glue laminated to the previously fully printed underside of the transparent web, since the underside is now opaque and the glue will not be visible through the lenticular surface and will not distort the three dimensional image.

A preferred printing system to accomplish the above process typically comprises nine, ten or more printing units. For example, the first series of four color perfecting printing units consists of four printing units to apply a line formed image on the opaque paper web. An additional series of four color perfecting printing units consists of an additional five or six printing units. Four of these units apply a line formed image on the underside of the plastic lenticular web material. A fifth print unit of the additional series may be used to apply an opaque print coat to the underside of the lenticular plastic web, over the previously printed line formed image. Further, a sixth print unit of the additional series may be used to apply a second opaque coat over the first opaque coat. The sixth print unit, or an additional print unit may apply printed text or other material to the opaque printed surface created by the fifth and sixth printing units described above.

In a further embodiment of the invention, the in-line printing processes mentioned above can be utilized to produce a high volume of display pieces adapted for back lit lighting. This is accomplished by printing the line formed image on the flat underside of the lenticular web material, and applying none or only a light coat of protective ink to cover the remaining undersurface. Light will be allowed to come through the portion of the material not covered by the image to be featured, thereby accenting that image.

DESCRIPTION OF THE PREFERRED EMBODIMENT

Figure 1:
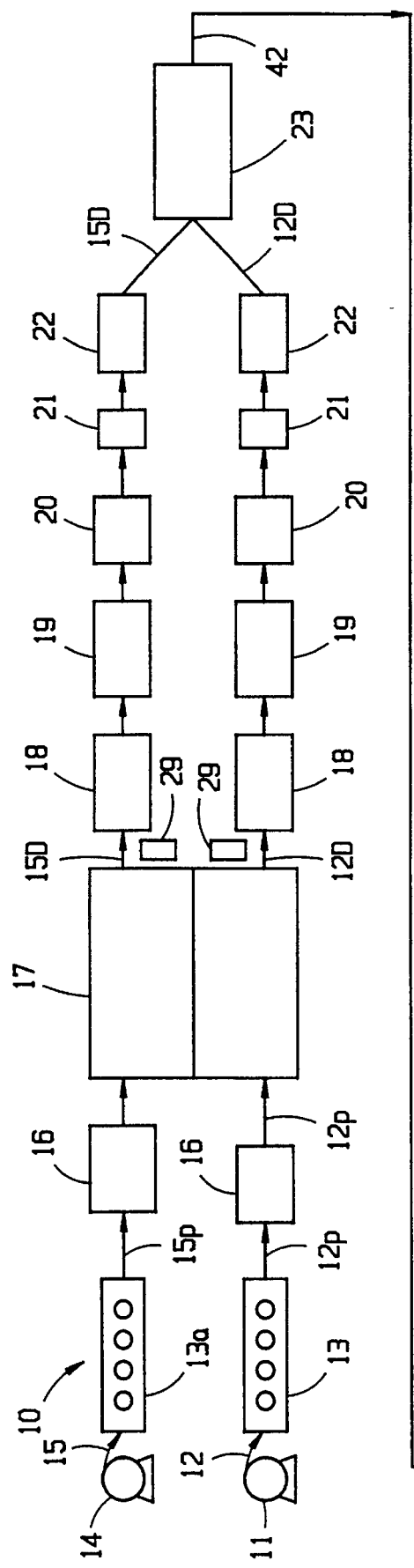
FIG. 1 is a schematic representation of a single in-line web offset, flexographic or rotogravure roll fed printing system which performs the steps of the process of one embodiment of the present invention.
Figure 1:
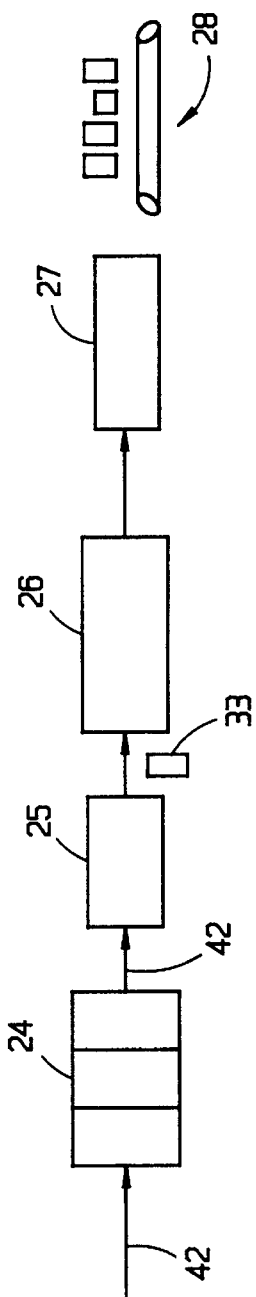

Referring to FIG. 1, there is shown a schematic representation of a single in-line printing process utilized in connection with a transparent lenticular material overlying the printed image for creating an illusion of depth or movement in the perception of a viewer of the image.

In-line printing apparatus 10 includes a first roll stand 11 delivering at a preselected speed an opaque web 12 of paper or other suitable material to a printer 13, which may be one or more web offset printing units, flexographic units, or rotogravure units, to produce printed web 12P. Desirably, printer 13 produces a printed image of screened dots or spots, preferably multi-colored so that the dots or spots form a four color almost continuous tone image. Additionally, the printed image on web 12P is a line formed image which forms a single three dimensional image when viewed through a lenticular lens array, as will be explained.

Figure 3:
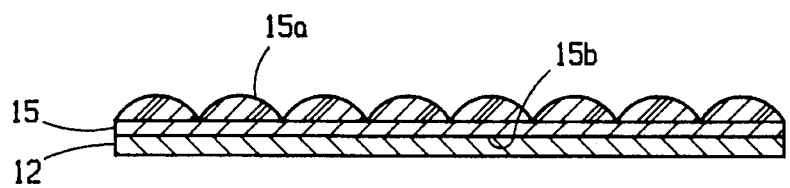
FIG. 3 is a cross-sectional fragmentary view of the lenticular transparent web material to which certain of the steps of the present invention are applied.

In the first embodiment, a second roll stand 14 provides a clear transparent web 15 having a lenticular or lens arrayed surface 15a on one side and a flat surface 15b on the opposing side (FIG. 3). Web 15 is advanced into a printer unit 13a, preferably the same as printer unit 13. Printer unit 13a is adapted to selectively print a four color screened image on the flat underside 15b of lenticular web 15. In certain embodiments of the present invention, no image is printed on underside 15b. In certain other embodiments of the present invention, a line formed image, or dual line formed images, are printed on flat surface 15b of transparent web 15 as the transparent web is continuously fed through printer unit 13a at the preselected speed. In these circumstances, a line formed image may also be simultaneously printed on web 12 by printer 13 as web 12 advances through printer 13 at the preselected speed. Or, it may be desired that no image be printed on the opaque web 12, while a line formed image is formed on undersurface 15b of transparent lenticular web 15. In this latter situation, web 12 is fed through printer 13, however the print mechanism in printer 13 is in an idle mode, and no printing ink is deposited on the surface of opaque web 12. In yet another situation, it may be desired to print a portion of the line formed image on web 12, and another portion on web 15, wherein print units 13 and 13a are both active to create the desired complete line formed image.

If desired, web 12 and flat surface 15b of lenticular web 15 can be imprinted with numbers or images applied as a coding reference, such as used for tracking responses and personalization through the addition of individual names and addresses. If the imprinter option is chosen, an imprinter unit 29, such as an ink jet printer, is located after ovens 17 in the in-line printing production apparatus 10, and applied to either or both webs 12P and 15P. Also, if desired, the apparatus 10 may include as an optional device a pattern gluer 16 located near the output side of printing unit 13. Pattern gluer 16 may be used to apply items such as remoistenable adhesive, rub-off, scratch-n-sniff, microfragrance, cosmetic samples and stamps to the surface of web 12P which faces away from the lenticular web in the finished product.

Since web 15 is preferably made of a plastic material, it may be desirable to apply a coating on the plastic as it is manufactured to stabilize the material and prevent web 15 from curling at its edges when fed from roll stand 14. Also, to prevent curling, inks should be used that produce a less or no volatile reaction with the plastic web material 15. For example, vegetable based inks, such as soybeans and other vegetables, may be substituted for standard solvent based printing inks.

The printed web 12P exits printer unit 13 at the preselected speed and is passed to one side of double web oven/chill roller unit 17, which dries the ink on the web 12P at the preselected speed to produce dried printed web 12D, with moisture and solvent materials removed.

At the same time, lenticular surface web 15P is advanced at the preselected speed directly to a second side of double web oven/chill roller unit 17. In those embodiments where an ink image is applied to flat surface 15b of web 15P, the oven dries the ink by removing moisture and solvent materials, and the chill rollers set the ink on the web. The oven through which web 15P passes is set to operate at a temperature below the melting point of material comprising web 15 to prevent melting or distortion of web 15 and its lensed surface 15a. It has been observed that a temperature in the range of 128° F. to 167° F. serves this purpose, with optimum results achieved at a temperature of 145°. The chill rollers set the ink, giving the ink rigidity and permanence.

Webs 12D and 15D next advance at the preselected speed to several elements of optional equipment which may be selectively included to accomplish certain operations on either the opaque web 12D or the transparent web 15D. If desired, one or both of webs 12D and 15D may be fed from the oven/chiller unit 17 to a pattern perforating unit 18 which punches a series of holes in the respective web to produce tear-out items, such as coupons, game features and business reply materials.

A further optional operation which may be applied to both webs 12D and/or 15D comprise imprinting consecutive numbers on the web at the preselected speed. If this option is desired, a numbering apparatus 19 is placed in the in-line printing production apparatus 10.

At this point in the production process of the preferred embodiment of the present invention, opaque web 12D is advanced at the preselected speed to a silicone application unit 20. Unit 20 applies a lubricant to the paper stock forming web 12D to retard scuffing and marks, to provide anti-static characteristics, to enhance jogging and handling, and to promote efficient sheeting and stacking of finished products.

If a die cutting operation is necessary to produce the finished printed three dimensional image product, the web 12D and/or the web 15D, or both are advanced at the preselected speed to an optional die cutter unit or units 21. The die cutter removes opaque paper or transparent material from the respective webs 12D and/or 15D, or both, to produce a contour pattern shape or knock-out openings where desired. The die cutter unit 21 is used to produce envelope windows, attention windows, see-through applications, business reply cards, and sample leave-behind items. By way of example, a finished product manufactured by the process of one of the preferred embodiments may include an opaque cover sheet formed of the material of web 12 and overlying the three dimensional image. The cover sheet may be attached at one lateral side to an adjacent edge of web 12D or 15D, with an aperture produced by the die cut process through which only a portion of the three dimensional image may be viewed through the lenticular film 15. When the cover sheet is lifted from the lenticular material surface, the entire three dimensional image is exposed for viewing.

Webs 12D and 15D are next advanced at the selected speed to the inputs of respective angle bar units 22. The angle bar units slit the webs 12D and 15D into multiple ribbons which are then interrelated to form multiple components, or leafs/pages of a catalog/book/brochure.

Figures 4A, 4B:
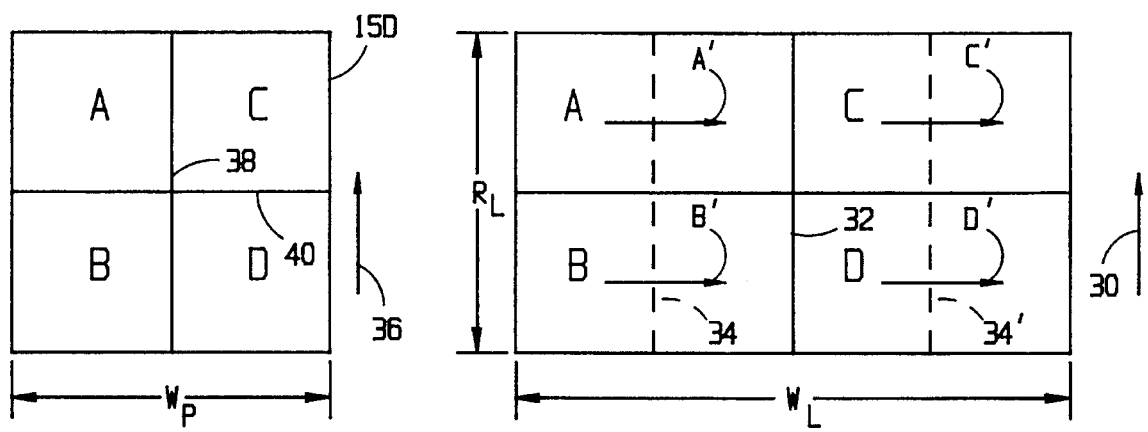
FIGS. 4A and 4B are schematic illustrations of the roll fed paper stock web and the roll fed transparent lenticular lens web as they are acted upon by the angle bar unit utilized in performing an embodiment of the process of the present invention.

An example of the operation of angle bars 22 in a preferred embodiment of the present inventive process is illustrated in FIGS. 4A and 4B. In this example, a web 12D (FIG. 4A) of opaque paper material is advanced in the direction designated by arrow 30. The width $W_L$ of the web 12D is sufficiently wide to form two finished three dimensional image products. Line 32 is a slit line, lines 34, 34' are fold lines, and identical line formed color images have been previously printed on the portion of web 12D extending on either side of line 32. In the example of FIGS. 4A, B, transparent web 15D has a width $W_p$ taken in a direction which is normal to the direction of movement of web 15D as indicated by the arrow 36 in FIG. 4B. In the example, $W_p$ is less than $W_L$.

In the example illustrated in FIGS. 4A and 4B, line formed images are printed by print unit 13a on panels A, B, C and D of plastic web material 15D. The web is then passed through oven 17 where the ink is dried. Then, the web 15D is slit along line 38 between panels A, C and B, D. Each part of web 15D is then moved to the right as viewed in FIGS. 4A, 4B, whereby panels A and B of web 15D are placed over and glued to the right hand portions of panels A and B of opaque web 12D (FIG. 4A). Likewise, panels C and D of web 15D are moved to the right, placed over and glued to the right hand portion of panels C and D of web 12D, where the arrow heads $C_1$, $D_1$ are located. These steps are all performed by the in-line printing process described previously. Plow tower 24 folds panels A and B of web 12D as a unit in half along fold line 34, and also fold panels C and D of web 12D as a unit along fold line 34'. Next, a rotary cutter slits panels A, B, C and D of web 12D apart, resulting in four separate signatures, each comprising a line formed three dimensional image backed by a portion of web 12D, with a removable cover overlying the lenticular film.

Referring again to FIG. 1, the webs 12D and 15D emerging from angle bar unit 22 advance towards a common nip in wet flap gluer unit 23, where the paper and transparent lenticular webs are aligned vertically as they will be in the finished product. In the example shown in FIGS. 4A and 4B, the ribbon of lenticular film (web 15D) is advanced between portions of web 12D which have been folded over one another along lines 34. In the example, therefore, the lenticular ribbon 15D is sandwiched between an upper cover portion and a lower backing portion of web material 12D. In the embodiment of the example, the line formed image to be viewed is printed on the upper side of web 12D, and is observable as a single image through the lenses forming the surface 15a of web 15. In an alternate embodiment of the invention, the line formed image is printed on the flat underside 15b (FIG. 3) of web 15D, and the portion of paper web 12D ultimately laminated to flat underside 15b of web 15 provides an opaque reflective backing to enable viewing of the line formed image through the lenticular lenses of web material 15D.

Wet flap gluer 23 adds glue to the advancing ribbons of web material 12D and 15D, and laminates the constituent pieces of the final product to each other as desired. In the embodiment where paper web material 12D is used for backing, gluer unit 23 adheres the paper to the flat underside 15b of web material 15D. Preferably, a quick setting glue is used in unit 23 to decrease the creation of air bubbles during the gluing process. Also, since web 15 is composed of a plastic material, the glue-applying pads in the laminating unit 27 are softer than where paper stock forms the webs. It has been observed that softer pads apply more glue and spread the glue more evenly to aid in the elimination of air bubbles, and/or rippling.

In one of the embodiments of the present invention, the line formed image is printed directly on underside surface 15b of web 15D, and no backing paper is adhered to the underside 15b. In this embodiment, no paper stock web is mounted on roll stand 11. In yet another embodiment, again where the image is printed directly on the flat underside of the lenticular material, paper stock 12 may be mounted on roll stand 11 and advanced through the in-line printing production system 10 as set forth above, with the exception that no image is printed on the paper stock web 12 by printer unit 13. The paper web 12 is not adhered to the lenticular web at any time during this alternate process, however, the paper protects the under surface of the transparent web 15D. At the end of the production process, the paper would drop off, or could be used as a form of packaging to deliver the final product to the consumer.

In operation, regarding those embodiments where the paper stock 12D is to be adhered to the transparent lenticular stock 15D, the wet flap gluer 23 applies a line or pattern of wet base adhesive. An important consideration is that the line formed image printed on either the underside 15b of the lenticular material 15D, or printed on the upper surface of the paper web 12D, must be in register and be viewable through the lens array on the upper surface 15a of web 15D. Therefore, the application of glue must be accomplished such that none of the hardened glue obstructs the view of the printed material. Additionally, the registration of the line formed image must be maintained within a low tolerance of error to assume the alignment of the lenses and the image. It is also contemplated within the scope of the present invention that additional wet flap glue units 23 may be included in the in-line system 10 to provide additional effects and options regarding the final finished product.

A laminated lenticular material/paper stock material ribbon 42 is advanced from wet flap gluer 23, except in the embodiment where no paper stock is used in the ultimate product, and no paper material is mounted on roll stand 11. Ribbon 42 then is fed into a plow tower unit 24, comprising three to seven or more plow tower elements. The plow towers fold the material over as required to produce the finished product. Optionally, a combination of a slit/ribbon method may be used above or in combination with the plow method if desired to obtain the final product. In the example of FIG. 4A,B, web 12D is folded along lines 34, while the lenticular film is not subjected to a folding process. The lenticular ribbon is advanced between the leaves of the folded-over paper stock in this embodiment. The plow tower units perform the folding function in a direction parallel to the direction of paper flow. If required, the plow tower unit is also capable of bead strip gluing in the web travel direction, glue tacking, trimming, perforating and/or slitting.

Subsequent to being folded in the plow tower unit 24, an optional mini-tower unit 25 may form part of the in-line printing production process described herein if it is required to make miniature folds, such as are necessary for sealing die-cut packets and envelope flaps if the finished product is so designed. Additionally, a personalization imprinter unit 33 may be included in the in-line system 10 to apply personal addresses on a signature folded in the form of an envelope.

The laminated web 42 in this embodiment is next fed to the input of a rotary cutter unit 26, which provides a final cut-off at right angles to the direction of web movement. This cutting operation, in the example of FIGS. 4A,B, severs the web into the components which comprise the final product and trims the products along the width. In the example of FIGS. 4A,B, this would comprise a three dimensional line formed image printed on paper stock 12 and visible through the lenticular lens surface of transparent material 15. The same blade is used to cut the plastic and paper material simultaneously, and optionally remove trimming waste of both webs. It is during this operation that die cut scallops or waves, for example, can be formed along an upper or lower edge of the finished product.

From the rotary cutter, the individual finished trimmed products are advanced to a stacking/weigh station 27, where the products are stacked, weighed and counted. Next, the stacked products are advanced to a finished product transportation unit 28 for delivery directly to the loading dock of the printing facility.

Figure 2:
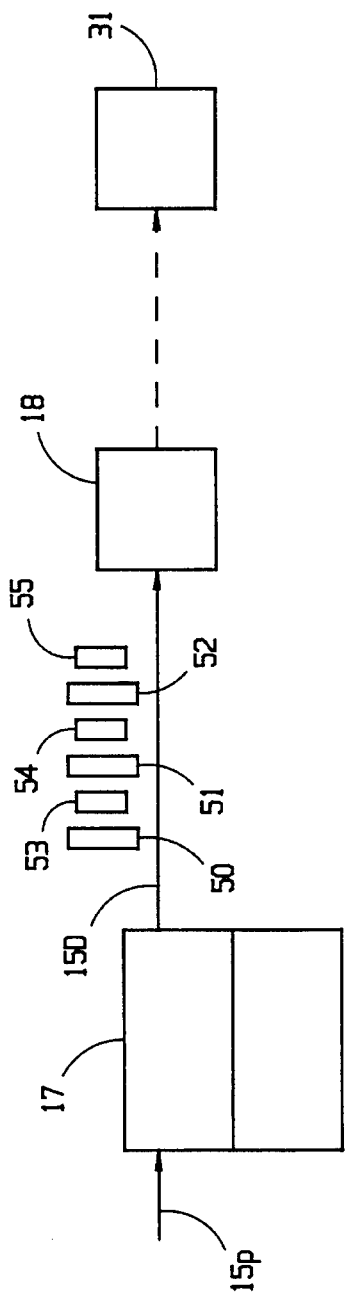
FIG. 2 is a schematic representation of a modification to the roll fed in-line printing system of FIG. 1, whereby the steps of a separate embodiment of the present invention are performed.

Referring to FIG. 2, another embodiment of the present invention comprises a plurality of additional printing units 50, 51, 52, or more as needed, added to the roll fed in-line printing production system 10 shown in FIG. 1. These additional printing units may be web offset, flexographic or rotogravure printing units, or any combination thereof, and are positioned following the double web oven/chill roller unit 17. A separate dryer 53, 54, 55 or more as needed, is located adjacent each additional printing unit 50, 51, 52 to rapidly dry and set the ink applied by the three printing units.

In a first production process utilizing the printing system illustrated in FIG. 2, a line formed printed image is applied first to the flat underside 15*b* of lenticular web 15 by print unit 13*a* (FIG. 1). After this initial application of ink, and the ink has been set by one side of double web oven/chill roll unit 17, sufficient ink in a uniform layer is additionally applied by units 50, 51 and 52 to the entire flat undersurface 15*b* over the initial line formed image, such that the initial line formed image remains visible through the lenticular lens system 15*a* embodied in web 15. Preferably, all three print units 50, 51, 52, and respective drying ovens 53, 54, 55, are utilized to apply three coats of ink to the remainder of flat underside 15*b* of web 15. However, there may be instances when only two or possibly one ink coat is sufficient to cover the flat surface. In these latter instances, the web 15 is passed only through two or one of printing units 51, 52 as required. In this embodiment of the present invention, the step of glue laminating paper stock backing to the lenticular material is eliminated, since light reflects from the covered flat surface 15*b* and the initially printed image is clearly visible through the lenticular surface 15*a*. Therefore, in this embodiment no paper is mounted on rollstand 11.

In a second embodiment of a process utilizing the in-line printing production system 10 as modified pursuant to FIG. 2, a line formed image is first applied to the flat undersurface 15*b* of web 15, as described previously. After oven/chill unit 17 has dried and set the ink forming the line formed image, print units 50 and 51 apply a uniform coat of opaque ink to cover the entire flat undersurface 15*b*, which ink is rapidly dried in ovens 53, 54 respectively. The third printing unit 52 (FIG. 2) applies a combination of text and graphic material to the now opaque coated undersurface 15*b* of the lenticular web 15. By way of example, if the initial line formed image printed on the flat underside 15*b* of web 15 is an athlete when viewed through the lenticular surface 15*a*, that athlete's career statistics and other information, such as advertising, could be applied to the surface created by the previous application of two coats of opaque ink using print unit 52 and oven/chill unit 55.

A third embodiment of a method utilizing the in-line printing production system 10 as modified pursuant to FIG. 2 comprises loading roll stand 11 with a roll 12 of paper stock, and roll stand 14 with a roll 15 of transparent lenticular web material, as shown in FIG. 1. As the webs advance, printing unit 13*a* applies a line formed image to the flat underside 15*b* of web 15. No image is applied to the paper stock 12 passing through printer unit 13. After oven/chill unit 17 sets the image on the flat underside of the lenticular material, either one, two or three of printing units 50, 51 and 52 apply an opaque coat to the entire flat undersurface 15*b*.

Simultaneously with the above steps, paper stock web 12 is advancing through the system, with nothing printed on the paper material. When the webs 12, 15 reach wet flap gluer 23, the paper stock 12 is glued to the flat underside 15*b* of the lenticular material. Due to the opaque ink covering the entire face of flat underside 15*b*, the glue adhering the paper web to the lenticular web will not be visible when the three dimensional image is viewed through lenticular lenses 15*a*. The paper stock 12 adds strength to the finished product, and also can be imprinted using print unit 52 with information such as a description of the visible three dimensional image, advertising, or the like.

In each of the three embodiments of the present invention discussed above with reference to FIG. 2, if desired, the web 15P may be advanced to a sheeter 31 at a selected point in the process illustrated in FIG. 1. This sheeter will divide the web into full or half size sheets of lenticular material.

Figure 5:
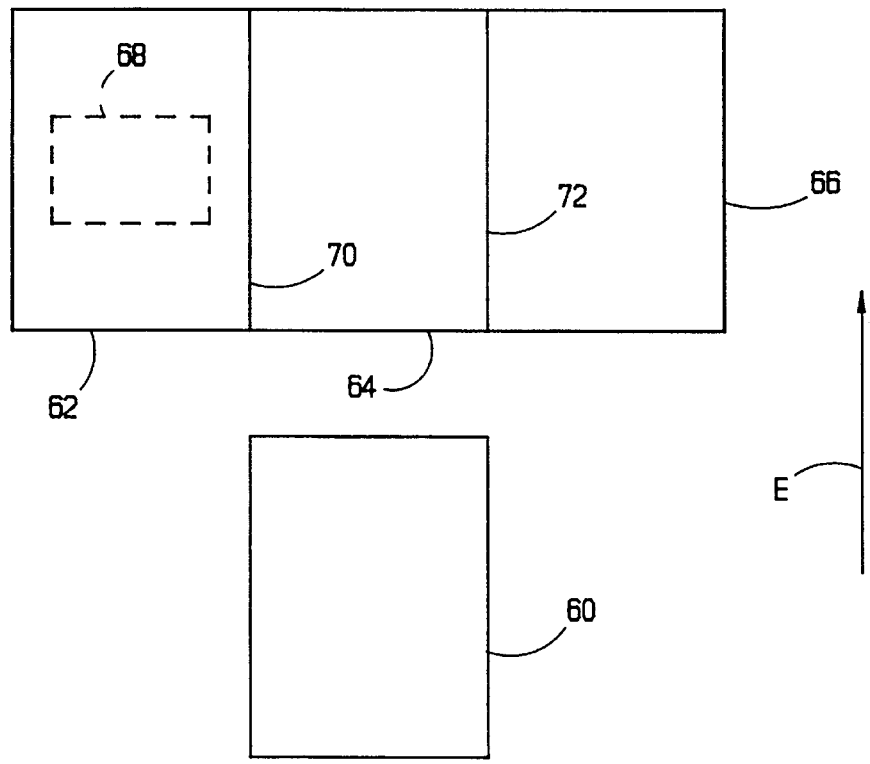
FIG. 5 is a schematic illustration of the transparent lenticular web and the opaque web advancing in an in-line printing process adapted to produce a multi-page signature including a line formed image.

FIG. 5 illustrates a method of the present invention for producing a multi-page signature including a line formed three dimensional image forming part of the signature, and also including a die cut opening in a cover page through which the three dimensional image, or a portion thereof, is visible. The numeral 60 represents a web of lenticular plastic material which is advancing at a predetermined speed through an in-line printing system which system has preferably previously applied a line formed image to the flat underside of the lenticular plastic web 60, as described. The web 60 is moving in the direction shown by the arrow E.

An opaque paper web having panels 62, 64, and 66 is also advancing through the printing system in the direction shown by the arrow E, and preferably has had selected printed material applied to one or both sides of each panel, depending upon the use of the final signature. Panel 62 is formed with a die-cut center 68 which has been removed from panel 62. Alternatively, die-cut center 68 can be cut on three sides, and remain attached to panel 62 on one side to form a flap (not shown). The die-cut center 68 is shown as a square, but can be any desired shape. Also, the upper surface of panel 64 may have a line formed image, or a portion of a line formed image previously printed thereon. Correspondingly, the flat surface of lenticular plastic web 60 may be blank, or may have a mating portion of a line formed image applied thereto, respectively, whereby a single line formed image appears when viewed through the lenticular surface in the final signature product.

The process shown in FIG. 5 for producing the final signature product in an in-line printing system comprises the steps of initially ribboning lenticular plastic web 60 onto and overlying center panel 64, and next glue laminating panel 60 to panel 64 in proper register so that the line formed image on the flat underside of lenticular panel 60, or the line formed image on opaque panel 64, or both, can be viewed as a single image when observed through the lenticular surface of panel 60.

Next, the die-cut panel 62 is folded over laminated panels 60 and 62 whereby the lenticular surface of panel 60 and the line formed image printed below the lenticular surface is visible. Panel 62 is then glue laminated at its linear edges to panels 60 and 64.

A plow unit forming part of the in-line printing system shown in FIG. 1 next folds panel 66 along edge 62 whereby panel 66 extends under panel 64, and forms the signature into an inverted V-shape. The signature is now ready to be stitched onto the spine of a magazine to form a cover for the magazine, by way of example.

In any of the embodiments described above, an animated finished product may be produced wherein the image visible through lenticular surface 15*a* changes as the angle from which the image is viewed changes. This involves printing line formed dual images on either the paper web 12 or the underside 15*b* of lenticular web 15, which dual images are in linear side by side relationship to form two distinct images when viewed through the coordinated lenticular surface 15*a* of web 15 at different angles. In all other aspects, the process here can be any of the in-line printing processes described previously.

In yet another embodiment of the process of the present invention utilizing the modification of FIG. 2, a final printed advertising display piece can be produced which is adapted for the application of back lighting for emphasis. In this embodiment, the line formed image, or dual line formed images if desired, are printed on undersurface 15b of transparent lenticular web 15. Thereafter, no coating of ink is applied to all of undersurface 15b of web 15, or a light protective coating of ink, colored if desired, is applied by print units 50, 51, or 52 such that light is able to pass through the uncoated or lightly coated portion of undersurface 15b upon which the line formed image(s) are printed when the final product formed from web 15 is mounted on a back lit display unit. Light passes through the clear or lightly colored area surrounding the line formed image, and is blocked by the line formed image which becomes accented in the display. If the image is a dual line formed image as described previously, the accented image in the back-lit display will change as the angle of observation of the viewer changes.

An additional or wet-trap method forming part of the present invention allows the in-line printing system discussed herein to produce a full size sheet comprising a three dimensional line formed image, or a plurality of three dimensional line formed images adapted for subsequent separation and use. In this method, after a four color line formed image has been applied as discussed previously to the flat underside of the lenticular web, an opaque full overprint of ink is applied to cover the underside of the lenticular web, including the portion over the previously printed, and somewhat wet, line formed image. Upon completion of these applications of ink, the lenticular web is advanced at a predetermined speed into a dryer, such as a gas oven dryer or similar drying apparatus, where the inks are set on the flat underside of the lenticular web.

The lenticular web then is advanced at the predetermined speed into a full size sheeter, which sheeter forms part of the in-line printing system in which the aforementioned processes are being performed. The full size sheeter is capable of cutting the lenticular plastic web into full or half size sheets, and then placing the sheets onto a stacker, ready for final trimming, if required, into individual pieces or as one large three-dimensional image sheet.

Figure 6:
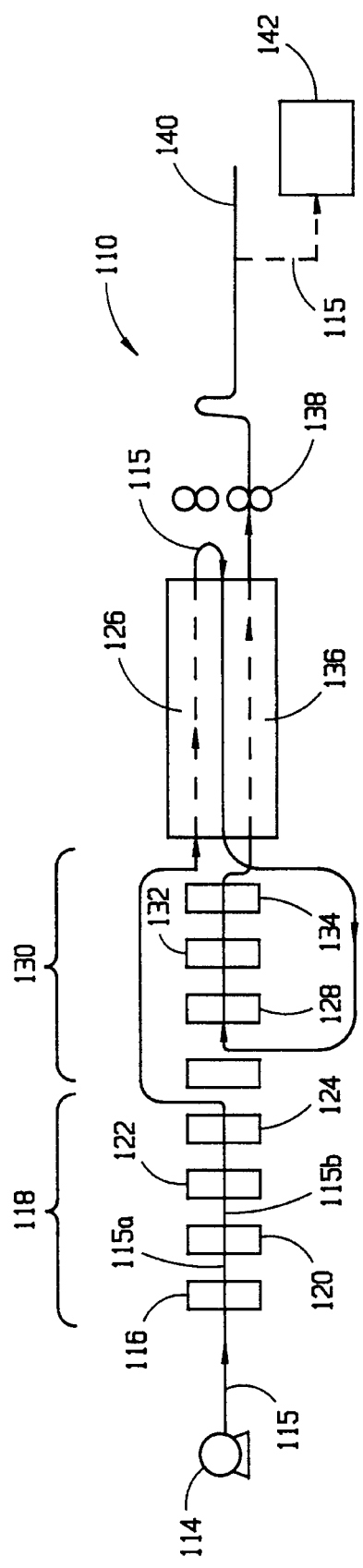
FIG. 6 is a schematic representation of an additional modification to the in-line printing system of FIG. 1, whereby the steps of an additional embodiment of the present invention are performed.

FIG. 6 is a schematic representation of an in-line printing apparatus 110 using a dry trap process to print a line formed image and an opaque backing on the flat side of a web of lenticular plastic film. A first roll stand 114 delivers a web of clear transparent web 115 having a lenticular or lens arrayed surface 115a on one side and a flat surface 115b on the opposing side, as discussed previously with regard to FIG. 3. The web 115 is fed from roll stand 114 at a predetermined speed in the direction indicated by the arrows in FIG. 6, and is advanced into the first unit 116 of a series forming a first four color perfecting web, flexographic or rotogravure printing press 118. Web 115 is then fed into subsequent color units 120, 122, 124 of printing press 118. Press 118 applies four color line formed screened or stochastic images on the flat underside 115b of web 115.

The web 115 is next fed to first drying oven 126 where the inks forming the line formed images are dried. Web 115 is then passed back under drying oven 126 to the second unit 128 of a second four color perfecting web, flexographic or rotogravure printing press 130. Printing unit 128 applies a coat of opaque ink over the entire flat surface 115b of the web 115, also covering the previously printed line formed image. If desired, web 115 is then fed through subsequent printing units 132 and/or 134 to apply a second or even a third coat of opaque ink. The amount of opaque ink applied to surface 115b is determined by the ultimate use to which the signature formed by the process is to be used. For example, if the signature is to be part of a back lit display, only one thin coat of opaque ink may be required. If the signature is to be a sports or other trading card, multiple coats may be required. Also, for some back lit display signatures, no opaque backing is applied, and web 115 is not advanced through press 130.

After an opaque coat, or multiple opaque coats are applied to surface 115b by printing press 130, the web 115 is advanced at the preselected speed into a second drying oven 136. After the opaque ink is dried, web 115 passes through chill roll unit 138 to set the ink and give the ink rigidity and permanence.

Web 115 is then advanced at the preselected speed to the remainder of the in line printing system designated by arrow 140, and as illustrated in further detail in FIG. 1. If desired, at a specified location in the in line printing system designated by the arrow 140, the web 115 may be advanced into a full or half size sheeter, which sub-divides the web 115 into a predetermined number of signatures.

The above described in-line methods of producing three dimensional lenticular line formed images produce a flat final product from an initial roll of lenticular web material, and in certain embodiments, an initial roll of opaque paper web. However, these in-line processes may also produce as an end result a roll of three dimensional line formed images, which roll is delivered to a customer, or a magazine printer for further separation steps.

An additional method encompassed by the present invention involves producing as an end product a roll of three dimensional line formed images, which roll is fed into another in-line finishing system for further operation such as folding, gluing, separation or the like.

While the principles of the invention have been described above in connection with specific articles and processes, it is to be understood that this description is made only by way of example and not as a limitation on the scope of the invention defined in the following claims.

The invention claimed:

1. A method of producing in a single in-line process a printed image suitable for creating an illusion of depth in the perception of a viewer of the image, comprising the steps of:

providing an opaque web to an in-line printing process;

providing a transparent web to the in-line printing process, said transparent web having a lenticular surface on one side and a flat surface on an opposing underside;

transporting said transparent web to a first printer unit of said in-line printing process at a pre-selected speed;

printing an image on said flat surface of said transparent web, said image being compatible for viewing when viewed through said lenticular surface of said transparent web;

applying an opaque material to cover the entire flat underside surface of said transparent web upon which said image is printed subsequent to the step of printing the image on said flat underside surface of said transparent web;

setting said image on said flat surface of said transparent web in a heat setting means of said in-line printing process, said transparent web advancing through said heat setting means at said pre-selected speed;

advancing said webs through a laminating means of said in-line printing process at said pre-selected speed and laminating said webs together, with said opaque web located beneath said transparent web and forming a final image which is visible when viewed through the lenticular surface;

advancing said laminated webs through a plow tower means for folding said opaque web into portions with said transparent web sandwiched therebetween;

advancing said laminated webs at said pre-selected speed into a cutting means of said in-line printing process, which cutting means cuts said laminated webs into sheets;

conveying said laminated sheets to a stacking means of said in-line printing process for stacking of said laminated sheets; and said final image printed on said flat surface of said transparent web creating the illusion of depth in said final image when viewed through the lenticular surface.

2. The method of claim 1 further including the steps of providing an additional web of material, laminating said additional material as a cover layer upon said laminated sheets, and die cutting and removing a portion of said cover layer overlying a portion of said laminated sheets, said image being observable through said die cut portion of said cover.

3. The method of claim 1 wherein said laminating step includes advancing said opaque web and said transparent web at said pre-selected speed to gluing means of said in-line printing process, selectively applying glue to said webs, and pressing said webs together.

4. The method of claim 3 wherein said laminating step includes passing said webs through a laminating nip roll station after passing said webs through said gluing means.

5. The method of claim 1 wherein the step of printing an image on said transparent web includes the step of printing a lined form single image on said web, which line formed single image comprises segments of said printed image in linear side by side relationship which forms a single, unified image when viewed through said lenticular surface of said transparent web.

6. The method of claim 1 wherein the step of applying opaque material to the flat surface of the transparent web includes the substeps of applying a plurality of coats of opaque material to said flat surface.

7. The method of claim 1 including the further steps of affixing additional printed material to said opaque material in a direction facing away from said flat surface of said transparent web.

8. The method of claim 1 including the further step of applying additional printed material to a surface of the opaque web facing away from the flat surface of the transparent web.

9. A method of producing in a single in-line printing process a printed image suitable for creating an illusion of depth in the perception of a viewer of the image, comprising the steps of:

providing a transparent web to an in-line printing process, the transparent web having a lenticular surface on one side and a flat surface on an opposing underside;

transporting the transparent web to a first printer unit of said in-line printing process at a pre-selected speed;

printing an image on the flat surface of the web, the image being compatible for viewing when viewed through the lenticular surface;

applying an opaque coating to the flat surface of the web subsequent to the step of printing an image on the flat surface of the web;

applying an opaque web material to the flat surface of the transparent web subsequent to the step of applying an opaque coating to the flat surface of the transparent web;

setting the image in a heat setting means of said in-line printing process, the transparent web advancing through the heat setting means at said pre-selected speed;

advancing the web at the pre-selected speed into a cutting means of said in-line printing process which cuts the web into individual units;

conveying said individual units to a stacking means for stacking said individual units; and the printed image on the flat surface of the web creating an illusion of depth when viewed through the lenticular surface of the web.

10. The method of claim 9 wherein the step of printing an image on the flat surface of the web includes the step of printing a line formed single image on said web, which line formed single image comprises segments of said printed image in linear side by side relationship which forms a single, unified image when viewed through said lenticular surface.

11. The method of claim 9 wherein the step of printing an image on the flat surface of the web includes the step of printing line formed dual images on said web, which line formed dual images comprise segments of said dual images printed on said web in linear side by side relationship to form two separately distinguishable images when viewed through said lenticular surface of said transparent web at varying angles.

12. The method of claim 9 wherein the step of applying an opaque coating to the flat surface of the web includes the substeps of applying a first coat of printing ink over the entire flat surface of the web and drying the first coat following the substep of applying the first coat.

13. The method of claim 12 including the additional substeps of applying a second coat of printing ink over the entire flat surface of the web subsequent to the substep of drying the first coat of printing ink, and drying the second coat of printing ink subsequent to the step of applying the second coat of printing ink.

14. The method of claim 13 including the additional substeps of applying a third coat of printing ink over the entire flat surface of the web subsequent to the substep of drying the second coat of printing ink, and drying the third coat of printing ink subsequent to the step of applying the third coat of printing ink.

15. The method of claim 9 wherein the opaque web material is applied to the flat surface of the transparent web by laminating the opaque web to the flat surface of the transparent web.

16. The method of claim 9 comprising the further of applying additional printed material to the opaque coating previously applied to the flat surface of the web.

17. The method of claim 9 wherein the opaque coating is applied to the flat surface of the web prior to the time the image printed on the flat surface has dried.

18. The method of claim 17 including the additional step of transporting said web at said predetermined speed to a drying apparatus, and drying the printed image and opaque material subsequent to the step of applying said opaque material.

19. The method of claim 18 including the step of cutting the web material into individual sheets subsequent to the step of drying the printed image and opaque material.

* * * * *